United States Patent
Zhou et al.

(10) Patent No.: US 8,769,112 B2
(45) Date of Patent: Jul. 1, 2014

(54) METHOD AND SYSTEM FOR POLICY AND CHARGING CONTROL BASED ON TIME PERIOD

(75) Inventors: Xiaoyun Zhou, Shenzhen (CN); Zaifeng Zong, Shenzhen (CN); Jinhua Wu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 159 days.

(21) Appl. No.: 13/258,288

(22) PCT Filed: May 20, 2010

(86) PCT No.: PCT/CN2010/073030
§ 371 (c)(1),
(2), (4) Date: May 16, 2012

(87) PCT Pub. No.: WO2010/148857
PCT Pub. Date: Dec. 29, 2010

(65) Prior Publication Data
US 2012/0233337 A1  Sep. 13, 2012

(30) Foreign Application Priority Data
Nov. 12, 2009 (CN) .......................... 2009 1 0212378

(51) Int. Cl.
*G06F 15/16* (2006.01)
(52) U.S. Cl.
USPC .................. 709/227; 709/203; 370/235
(58) Field of Classification Search
CPC . H04M 15/66; H04M 15/00; H04M 15/8016; H04L 65/80
USPC ................... 709/203, 227; 370/235
See application file for complete search history.

(56) References Cited

U.S. PATENT DOCUMENTS

2010/0287285 A1* 11/2010 Castellanos Zamora et al. .............................. 709/227
2011/0065435 A1 3/2011 Pancorbo Marcos et al.
2011/0170411 A1* 7/2011 Wang et al. ................... 370/235

FOREIGN PATENT DOCUMENTS

| CN | 101222413 A | 7/2008 |
| CN | 101436987 A | 5/2009 |
| WO | 2009132722 A1 | 11/2009 |

OTHER PUBLICATIONS

3rd Generation Partnership Project (3GPP). vol. 9; Sep. 2009 pp. 1-92.*
International Search Report in international application No. PCT/CN2010/073030, mailed on Sep. 2, 2010.

(Continued)

*Primary Examiner* — Frantz Jean
(74) *Attorney, Agent, or Firm* — Oppedahl Patent Law Firm LLC (57) ABSTRACT

The disclosure discloses a method for Policy and Charging Control (PCC) based on a time period, which comprises: when a Policy and Charging Rule Function (PCRF) entity provides Quality of Service (QoS) rules to a Bearer Binding and Event Reporting Function (BBERF) entity, a time indication of activation and/or deactivation of the QoS rules is provided at the same time. The disclosure also discloses a system for PCC based on a time period, which comprises: a providing unit located in the PCRF entity and configured to provide QoS rules and a time indication of activation and/or deactivation of the QoS rules to the BBERF entity at the same time. The disclosure ensures the consistency between the time of activating the QoS rules by the BBERF entity and the time of activating the PCC rules by the Policy and Control Enforcement Function (PCEF) entity, and the technical scheme is simple and practical.

6 Claims, 4 Drawing Sheets

(56) References Cited

OTHER PUBLICATIONS

English Translation of the Written Opinion of the International Search Authority in international application No. PCT/CN2010/073030, mailed on Sep. 2, 2010.
BBERF interaction for time of the day procedures Feb. 26, 2010.
Clarification to Gateway Control and QoS Rule Request Jan. 16, 2009.
Supplementary European Search Report in European application No. 10791363.4, mailed on Mar. 28, 2013.

3rd Generation Partnership Project; Technical Specification Group Core Network and Terminals; Policy and Charging Control over Gx reference point (Release 9), 3GPP Standard; 3GPP TS 29.212, 3rd Generation Partnership Project (3GPP), Mobile Competence Centre; 650, Route des Lucioles; F-06921 Sophia-Antipolis Cedex; France, No. V9.0.0 Sep. 1, 2009.
Digital cellular telecommunications system (phase 2+); Universal Mobile Telecommunications System (UMTS); LTE; Policy and charging control architecture (3GPP TS 23.203 version 8.6.0 Release 8), Technical Specification, European Telecommunications Standards Institute (ETSI), 650, Route des Lucioles; F-06921 Sophia-Antipolis; France, No. V8.6.0 Jun. 1, 2009.

\* cited by examiner

METHOD AND SYSTEM FOR POLICY AND CHARGING CONTROL BASED ON TIME PERIOD

TECHNICAL FIELD

The disclosure relates to a Policy and Charging Control (PCC) technology in a radio communication system, and in particular to a method and a system for PCC based on a time period in a 3$^{rd}$ Generation Partnership Project (3GPP) packet system.

BACKGROUND

Since a 3GPP Release 7 standard system is established, the policy and charging function is realized by a PCC framework. The PCC framework is a function framework which can be applied to multiple access technologies, for example, the PCC framework can be applied to a Universal Mobile Telecommunications System (UMTS) Terrestrial Radio Access Network (UTRAN), a Global system for Mobile Communication (GSM)/Enhanced Data Rate For GSM Evolution (EDGE) radio access network, an Intelligent Wireless Local Area Network (I-WLAN) and an Evolved Packet System (EPS), etc.

Figure 1:
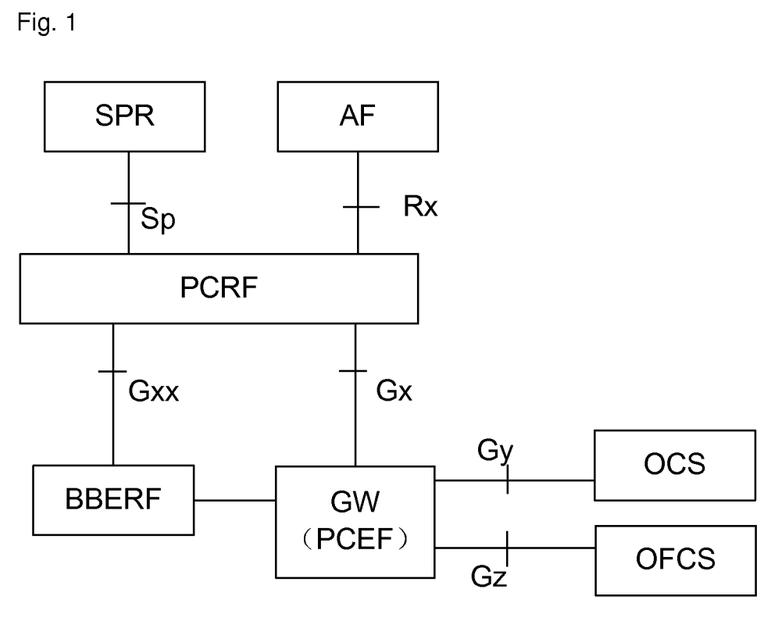
FIG. 1 shows a schematic diagram of a PCC structure according to Release8.

The PCC mainly realizes two functions, that is, a policy control function and a charging function. FIG. 1 shows a schematic diagram of a PCC structure according to Release8; as shown in FIG. 1, each logical function entity and the interface function in the PCC framework are as follows:

an Application Function (AF) entity provides an access point for service applications, wherein network resources used by the service applications need dynamical policy control. When a parameter negotiation is performed on a service plane, the AF entity provisions relevant service information to a Policy and Charging Rule Function (PCRF) entity; if the service information is consistent with a policy of the PCRF entity, then the PCRF entity accepts the negotiation; otherwise, the PCRF entity refuses the negotiation and gives service parameters acceptable by the PCRF entity at the time of sending feedback. Subsequently, the AF entity can feed back the parameters to user equipment (UE), wherein an interface between the AF entity and the PCRF entity is an Rx interface.

The PCRF entity is the core of the PCC and is responsible for making a policy decision and charging rules. The PCRF entity provides network control rules based on a service data flow, wherein the network control comprises detection, gating control, Quality of Service (QoS) control of a service data flow and data flow based charging rules. The PCRF entity sends the policy and charging rules made by itself to a Policy and Control Enforcement Function (PCEF) entity for execution, besides, the PCRF entity is required to guarantee the consistency between the rules and user subscription information. The basis for the PCRF entity to make policy and charging rules comprises: service-related information received from the AF entity, user PCC-related subscription information obtained from a Subscription Profile Repository (SPR) and bearer-related network information obtained from the PCEF entity.

The PCEF entity is usually located in a Gate-Way (GW) and is adapted to execute, on a bearer plane, the policy and charging rules made by the PCRF entity. The PCEF entity detects service data flows according to a service data flow filter in the rules sent by the PCRF entity, and further executes the policy and charging rules made by the PCRF entity for the service data flows. When a bearer is established, the PCEF entity carries out a QoS authorization according to the rules sent by the PCRF entity and performs gating control according to the information provided by the AF entity. According to the charging rules sent by the PCRF entity, the PCEF entity executes a corresponding service data flow charging operation, wherein the charging can be online charging or offline charging. If it is the online charging, the PCEF entity needs to perform credit management together with an Online Charging System (OCS); if it is the offline charging, the PCEF entity exchanges relevant charging information with an Offline Charging System (OFCS). An interface between the PCEF entity and the PCRF entity is a Gx interface, an interface between the PCEF entity and the OCS is a Gy interface, and an interface between the PCEF entity and the OFCS is a Gz interface. The PCEF entity is usually located at a network gateway, such as a Gateway GPRS Support Node (GGSN) in a General Packet Radio Service (GPRS) technology and a Packet Data Gateway (PDG) in an I-WLAN.

The function of a Bearer Binding and Event Reporting Function (BBERF) entity comprises bearer binding, validation of uplink bearer binding, and event reporting. When access of UE is carried out through an Evolved Universal Terrestrial Radio Access Network (E-UTRAN) and a Proxy Mobile IPv6 protocol is applied between a Serving Gateway (S-GW) and a Packet Data Network-Gateway (P-GW), the BBERF entity is located at the S-GW of the EPS; when the UE accesses the EPS through an untrusted non-3GPP access network, the BBERF entity is located at an Evolved Packet Data Gateway (ePDG); when the UE accesses the EPS through a trusted non-3GPP access network, the BBERF entity is located at an access gateway of a non-3GPP access network. When a BBERF entity exists, the PCRF entity needs to provision policy control information (such as QoS rules, event triggers, etc.) to the BBERF entity while provisioning policy and charging control information (such as PCC rules, event triggers, etc.) to the PCEF entity, and at the same time carries out policy and charging control on an IP Connectivity Access Network (IP-CAN) session established by the UE through the PCEF entity and the BBERF entity.

The SPR stores the user PCC subscription information related to policy control and charging; an interface between the SPR and the PCRF entity is an Sp interface.

The OCS, together with the PCEF entity, performs user credit control and management when the online charging is used.

The OFCS, together with the PCEF entity, accomplishes charging operation when the offline charging is used.

In the prior art, while provisioning the PCC rules, the PCRF entity also provisions time information for indicating when the PCEF entity shall set the PCC rules to an activation state (that is, activating the PCC rules, initiating a resource preservation process to allocate resources for the PCC rules) and time information for indicating when the PCEF entity shall set the PCC rules to an inactivation state (that is, stopping activating the PCC rules, initiating a resource release process to release corresponding resources of the PCC rules), and also can provision time information for indicating when the PCEF entity shall request the PCRF entity again for new PCC rules. By using the mechanism above, the PCC can support user charging control based on different time periods within one day, for example, in the middle night or at dawn, the PCEF entity activates PCC rules which have a lower fee rate (that is, allocating resources for the PCC rules) according to the indication in the PCC rules provisioned by the PCRF entity to perform PCC on a user, while in the daytime, the PCEF entity sets the PCC rules to an inactivation state (that is, releasing resources of the PCC rules), and sets PCC rules which have a higher fee rate to an activation state (that is, allocating resources for the PCC rules).

However, in the prior art, the PCRF entity provisions the time indication of activation and/or deactivation of PCC rules only when provisioning the PCC rules; if a BBERF entity exists, the PCRF entity does not provision any time indication while provisioning QoS rules. When the PCC rules provisioned to the PCEF entity by the PCRF entity are not activated, the QoS rules corresponding to the PCC rules provisioned by the PCRF entity to the BBERF entity have been activated (because no time indication is provisioned while the QoS rules are provisioned, the BBERF entity activates the QoS is rules immediately after obtaining the QoS rules). Thus, the activation time of the PCC rules in the network systems is not consistent, even a mistake is caused; besides, resources are wasted.

SUMMARY

In view of the problem above, the main objective of the disclosure is to provide a method and a system for PCC based on a time period to enable a PCRF entity to provide a time indication of activation and/or deactivation of QoS rules while providing the QoS rules to the BBERF entity.

In order to realize the objective above, the technical scheme of the disclosure is realized in a manner as follows.

A method for PCC based on a time period comprises:

providing, by a Policy and Charging Rule Function (PCRF) entity, a time indication of activation and/or deactivation of Quality of Service (QoS) rules to a Bearer Binding and Event Reporting Function (BBERF) entity while providing the QoS rules by the PCRF entity to the BBERF entity.

Preferably, the step of providing the QoS rules by the PCRF entity to the BBERF entity may comprise:

after the PCRF entity receives a gateway control session establishment request message from the BBERF entity, making PCC rules and QoS rules corresponding to the PCC rules by the PCRF entity, determining time of activation and/or deactivation of the PCC rules and the QoS rules by the PCRF entity, and providing the QoS rules and the time of activation and/or deactivation of the QoS rules by the PCRF entity to the BBERF entity through a gateway control session establishment acknowledgement message.

Or, the step of providing the QoS rules by the PCRF entity to the BBERF entity may comprise:

after the PCRF entity receives a gateway control and QoS rule request message from the BBERF entity, updating or remaking PCC rules and QoS rules corresponding to the PCC rules by the PCRF entity, determining time of activation and/or deactivation of is the updated or remade PCC rules and QoS rules by the PCRF entity, and providing the QoS rules and the time of activation and/or deactivation of the QoS rules by the PCRF entity to the BBERF entity through a gateway control and QoS rule request acknowledgement message.

Or, the step of providing the QoS rules by the PCRF entity to the BBERF entity may comprise:

after the PCRF entity receives a request of triggering QoS rule modification, updating or remaking PCC rules and QoS rules corresponding to the PCC rules by the PCRF entity, determining time of activation and/or deactivation of the updated or remade PCC rules and QoS rules by the PCRF entity, and providing the QoS rules and the time of activation and/or deactivation of the QoS rules by the PCRF entity to the BBERF entity through a gateway control and QoS rule providing message.

Preferably, the request of modifying PCC rules and QoS rules may be triggered by an Application Function (AF) entity, a Subscription Profile Repository (SPR) or the PCRF entity.

Preferably, the method may further comprise:

after the BBERF entity receives the QoS rules and the time indication of activation and/or deactivation of the QoS rules provided by the PCRF entity, activating and/or deactivating the QoS rules by the BBERF entity according to the time of activation and/or deactivation of the QoS rules.

Preferably, the method may further comprise:

providing, by the PCRF entity, PCC rules corresponding to the QoS rules and time of activation and/or deactivation of the PCC rules to a Policy and Control Enforcement Function (PCEF) entity; wherein the time of activation and/or deactivation of the QoS rules provided to the BBERF entity is the same as the time of activation and/or deactivation of the PCC rules provided to the PCEF entity.

A system for PCC based on a time period comprises:

a providing unit located in a Policy and Charging Rule Function (PCRF) entity and configured to provide QoS rules and a time indication of activation and/or deactivation of the QoS rules to a Bearer Binding and Event Reporting Function (BBERF) entity at the same time.

Preferably, the providing unit may further comprise:

a receiving sub-unit configured to receive a gateway control session establishment request message from the BBERF entity;

a making and determining sub-unit configured to, after the receiving sub-unit receives the gateway control session establishment request message, make PCC rules and QoS rules corresponding to the PCC rules, and determine time of activation and/or deactivation of the PCC rules and the QoS rules; and a providing sub-unit configured to provide the QoS rules and the time of activation and/or deactivation of the QoS rules to the BBERF entity through a gateway control session establishment acknowledgement message.

Or, the providing unit may further comprise:

a receiving sub-unit configured to receive a gateway control and QoS rule request message from the BBERF entity;

a making and determining sub-unit configured to, after the receiving sub-unit receives the gateway control and QoS rule request message, update and remake PCC rules and QoS rules corresponding to the PCC rules, and determine time of activation and/or deactivation of the updated or remade PCC rules and QoS rules; and a providing sub-unit configured to provide the updated or remade QoS rules and the time of activation and/or deactivation of the updated or remade QoS rules to the BBERF entity through a gateway control and QoS rule request acknowledgement message.

Or, the providing unit may further comprise:

a receiving sub-unit configured to receive a request of triggering PCC rule and QoS rule modification;

a making and determining sub-unit configured to, after the receiving sub-unit receives the gateway control and QoS rule request message, update and remake PCC rules and QoS rules corresponding to the PCC rules, and determine time of activation and/or deactivation of the updated or remade PCC rules and QoS rules; and a providing sub-unit configured to provide the updated and remade QoS rules and the time of activation and/or deactivation of the updated and remade QoS rules to the BBERF entity through a gateway control and QoS rule request acknowledgement message.

Preferably, the request of modifying PCC rules and QoS rules may be triggered by an Application Function (AF) entity, or a Subscription Profile Repository (SPR) and the PCRF entity.

Preferably, the system may further comprise a receiving unit and an execution unit, wherein the receiving unit is located in the BBERF entity and configured to receive the QoS rules and the time of activation and/or deactivation of the QoS rules provided by the providing unit;

the execution unit is located in the BBERF entity and configured to activate and/or deactivate the QoS rules according to the time of activation and/or deactivation of the QoS rules.

Preferably, the providing unit may be further configured to provide PCC rules corresponding to the QoS rules and time of activation and/or deactivation of the PCC rules to the PCEF entity, wherein the time of activation and/or deactivation of the QoS rules provided to the BBERF entity is the same as the time of activation and/or deactivation of the PCC rules provided to the PCEF entity.

In the disclosure, the PCRF entity determines time of activation and/or deactivation of the QoS rules after making QoS rules, and provides the time of activation and/or deactivation of the QoS rules at the same time of providing QoS rules to the BBERF entity; in this way, the BBERF entity can activate and/or deactivate QoS rules according to a provided time of activation and/or deactivation of the QoS rules, therefore, the consistency between the time of activating QoS rules by BBERF entity and the time of activating PCC rules by PCEF entity is guaranteed.

DETAILED DESCRIPTION

The basic idea of the disclosure is that: a PCRF entity, after making QoS rules, determines time of activation and/or deactivation of the QoS rules; while providing QoS rules to a BBERF entity, the PCRF entity provides the time of activation and/or deactivation of the QoS rules at the same time; wherein the time of activation and/or deactivation provided when the PCRF entity provides the QoS rules to the BBERF entity is the same as the time of activation and/or deactivation provided when the PCRF entity provides the PCC rules corresponding to the QoS rules to the PCEF entity. In this way, the BBERF entity can activate and/or deactivate the QoS rules according to the provided time of activation and/or deactivation of the QoS rules, therefore, the consistency between the time of activating the QoS rules by the BBERF entity and the time of activating the PCC rules by PCEF entity is guaranteed.

For a better understanding of the purpose, the technical scheme and the advantages of the disclosure, embodiments are provided below to further illustrate the is disclosure in detail by referring to the drawings.

Embodiment 1

Figure 2:
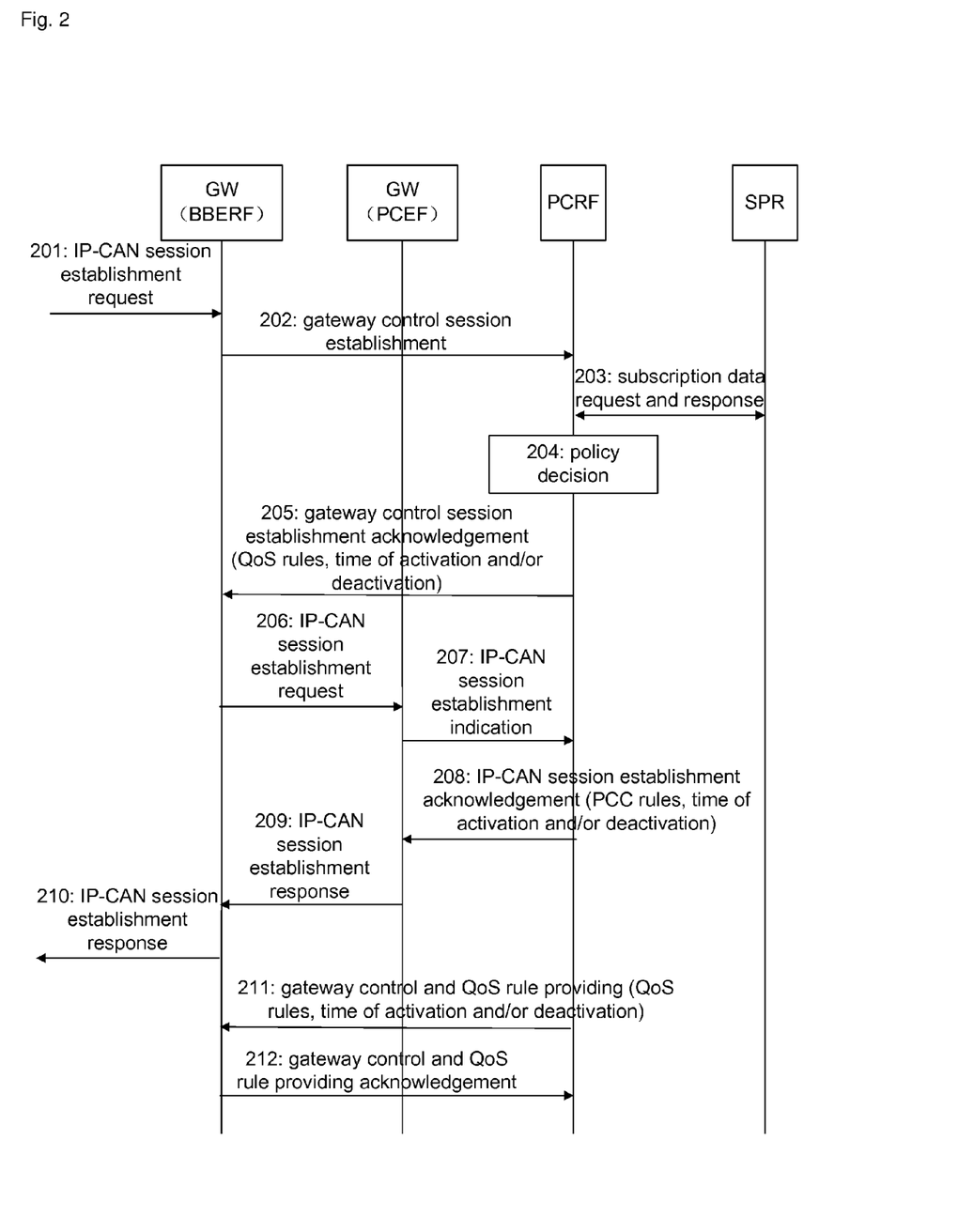
FIG. 2 shows a flowchart of a method for PCC based on a time period according to Embodiment 1 of the disclosure.

In this embodiment, during a process of UE establishing an IP-CAN session, a PCRF entity provisions PCC rules and QoS rules to a PCEF entity and a BBERF entity respectively; the PCC rules and the QoS rules comprise time indications of activation and/or deactivation of the rules. FIG. 2 shows a flowchart of a method for PCC based on a time period according to Embodiment 1 of the disclosure; as shown in FIG. 2, the method for PCC based on a time period comprises the following steps:

step S201: a gateway at which a BBERF entity is located receives an IP-CAN session establishment request message initialized by a user;

step S202: the BBERF entity sends a gateway control session establishment message to a PCRF entity;

step S203: if the PCRF entity does not have user subscription relevant information, the PCRF entity sends a request message to a SPR which then sends relevant user subscription information to the PCRF entity, then the PCRF entity stores the information; if the PCRF entity has user subscription relevant information, step S204 is executed directly;

step S204: the PCRF entity makes a policy decision, making PCC rules and corresponding QoS rules according to the relevant user subscription information and a local control policy, and determines time of activation and/or deactivation of the PCC rules and the QoS rules;

step S205: the PCRF entity sends the BBERF entity a gateway control session establishment acknowledgement message, in which the QoS rules made by the PCRF entity and the time of activation and/or deactivation of the QoS rules are included; if the gateway control session establishment acknowledgement message includes time information of activation of the QoS rules, then the BBERF entity does not activate the QoS rules immediately, but initiates a resource preservation process to preserve resources and activates the QoS rules when the activation time is up, otherwise, the is BBERF entity activates the QoS rules immediately; if the gateway control session establishment acknowledgement message includes time information of deactivation of the QoS rules, then the BBERF entity deactivates the QoS rules when the deactivation time is up and initiates a resource release process to release resources; the BBERF entity does not interact with the PCRF entity when activating and/or deactivating the QoS rules, except that an error occurs in the activation process;

step S206: this step can be executed together with step 201 simultaneously; the gateway at which the BBERF entity is located sends an IP-CAN establishment request message to a gateway at which the PCEF entity is located;

step S207: after receiving the IP-CAN establishment request message sent from the BBERF entity, the PCEF entity sends an IP-CAN session establishment indication message to the PCRF entity;

step S208: the PCRF entity returns the PCEF entity an IP-CAN session establishment acknowledgement message, in which the PCC rules made by the PCRF entity policy decision in step S204 and the time of activation and/or deactivation of the PCC rules are included; if the IP-CAN session establishment acknowledgement message includes the activation time, the PCEF entity does not activate corresponding PCC rules immediately, but initiates a resource preservation process to preserve resources and activates the PCC rules when the activation time is up, otherwise, the PCEF entity activates the PCC rules immediately; if the IP-CAN session establishment acknowledgement message includes the deactivation time, the PCEF entity deactivates the PCC rules when the deactivation time is up and initiates a resource release process to release resources; the PCEF entity does no interact with the PCRF entity when activating and/or deactivating the PCC rules, except that an error occurs in the execution process; the PCRF entity might modify the PCC rules and the QoS rules made in step S204 according to the information received in step S207, and return the time of activation and/or deactivation of the modified PCC rules at the same time of returning the modified PCC rules to the PCEF entity, that is, the time of activation and/or deactivation of the modified PCC rules might be modified;

the time of activation and/or deactivation provided when the PCRF entity provides the QoS rules to the BBERF entity is the same as the time of activation and/or deactivation provided while the PCRF entity provides the PCC rules corresponding to the QoS rules to the PCEF entity;

step S209: the gateway at which the PCEF entity is located returns an IP-CAN session establishment response message to the gateway at which the BBERF entity is located;

step S210: the gateway at which the BBERF entity is located returns the IP-CAN session establishment response message;

step S211: in step S208, if the PCRF entity modifies the PCC rules and the QoS rules, then the PCRF entity sends the BBERF entity a gateway control and QoS rule providing message, in which the modified QoS rules and the time of activation and/or deactivation of the modified QoS rules are included; and step S212: the BBERF entity returns a gateway control and QoS rule providing acknowledgement message to the PCRF entity.

According to the above flow, the PCRF entity provisions the time indication of activation and/or deactivation of the PCC rules corresponding to the QoS rule while provisioning the QoS rules to the BBERF entity, therefore the QoS rules and the PCC rules corresponding to the QoS rules are activated at the same time and deactivated at the same time.

Embodiment 2

Figure 3:
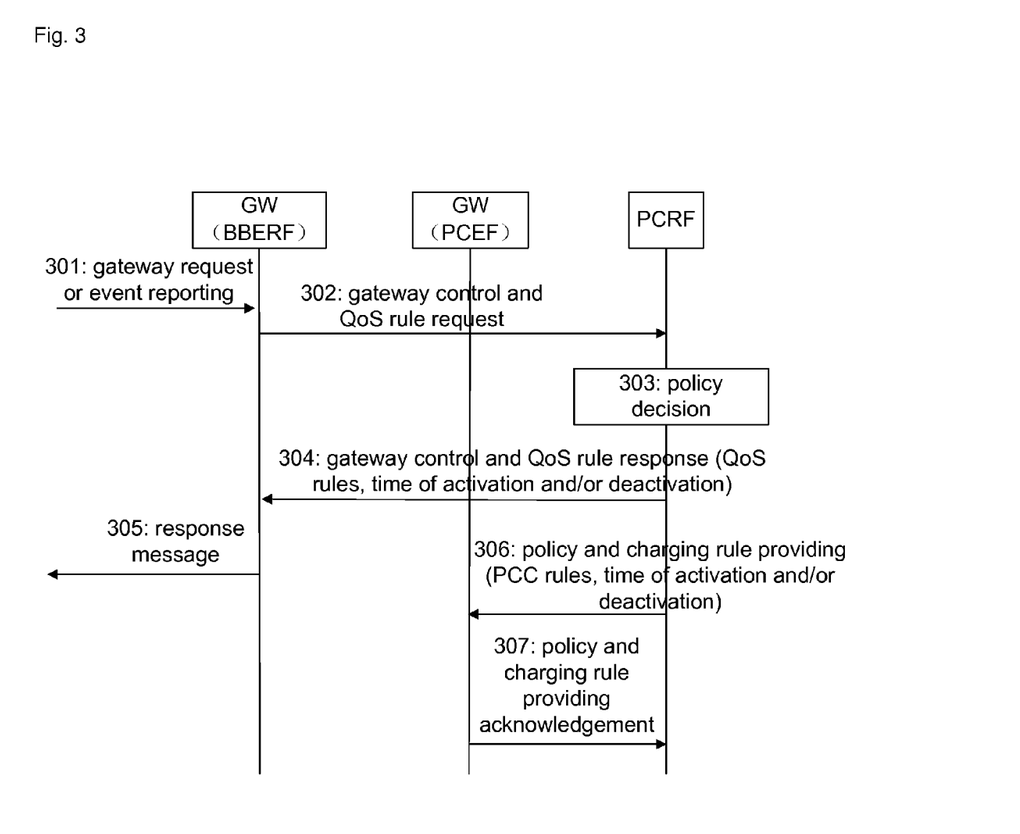
FIG. 3 shows a flowchart of a method for PCC based on a time period according to Embodiment 2 of the disclosure.

In this embodiment, a PCRF entity provisions PCC rules and QoS rules to a PCEF entity and a BBERF entity respectively during a modification process of an IP-CAN according to a request from the BBERF entity; the PCC rules and the QoS rules comprise time indications of activation and/or deactivation of the rules. FIG. 3 shows a flowchart of a method for PCC based on a time period according to Embodiment 2 of the disclosure; as shown in FIG. 3, the method for PCC based on a time period comprises the following steps:

step S301: the BBERF entity is requested event reporting or new QoS rules;

step S302: the BBERF entity sends a gateway control and QoS rule request message to the PCRF entity;

step S303: the PCRF entity makes a policy decision, including making PCC rules and corresponding QoS rules, and determining time of activation and/or deactivation of the PCC rules and the QoS rules; wherein this decision-making process comprises making new PCC rules and QoS rules and the time of activation and/or deactivation of the new PCC rules and QoS rules, and updating provisioned PCC rules and QoS rules and the time of activation and/or deactivation of the provisioned PCC rule and QoS rules;

step S304: the PCRF entity sends the BBERF entity a gateway control and QoS rule request acknowledgement message, in which the QoS rules newly made or updated by the PCRF entity policy decision and the time of activation and/or deactivation of the new QoS rules are included; if the time of activation and/or deactivation is updated, then the BBERF entity activates or deactivates the updated QoS rules according to the new time; to sum up, the BBERF entity activates corresponding QoS rules according to the currently received time indication of activation and/or deactivation;

step S305: the gateway at which the BBERF entity is located returns a response message;

step S306: the PCRF entity sends the PCEF entity a policy and charging rule providing message, in which the PCC rules made in step S303 and the time of activation and/or deactivation of the PCC rules are included; the PCEF entity activates and or deactivates the PCC rules according to the time of activation and/or deactivation;

the time of activation and/or deactivation provided when the PCRF entity provides the QoS rules to the BBERF entity is the same as the time of activation and/or deactivation provided when the PCRF entity provides the PCC rules corresponding to the QoS rules to the PCEF entity; and step S307: the PCEF entity returns an acknowledgement message to the PCRF entity.

According to the flow above, the PCRF entity provisions new or updated PCC rules and QoS rules as well as time indications of activation and/or deactivation of the PCC rules and the QoS rules to the PCEF entity and the BBERF entity simultaneously according to a request; therefore, the PCC rules or the QoS rules still can be simultaneously activated or simultaneously deactivated at a same time point.

Embodiment 3

Figure 4:
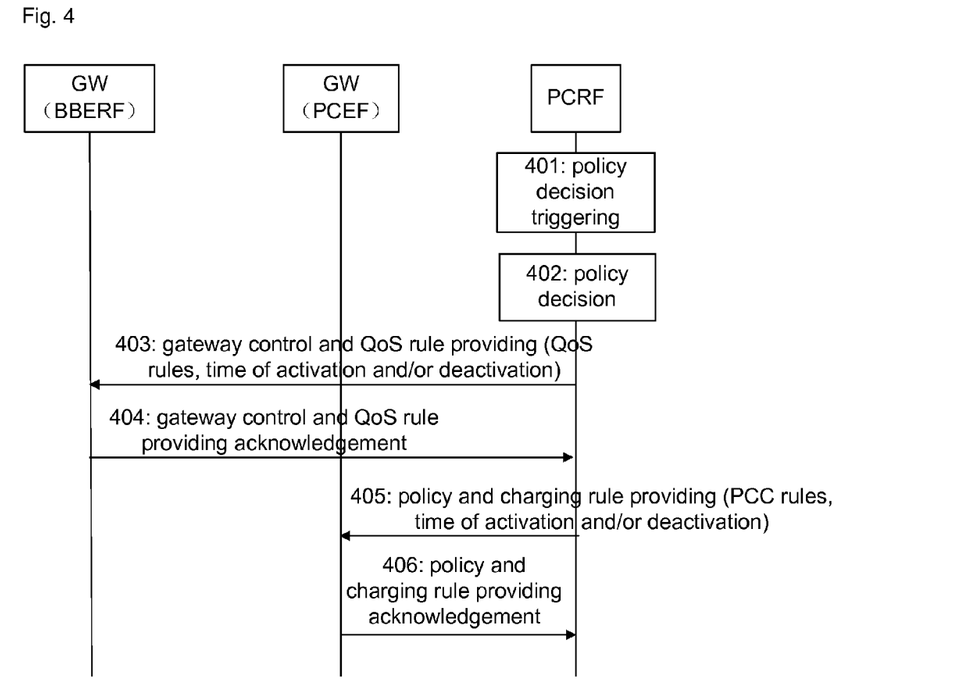
FIG. 4 shows a flowchart of a method for PCC based on a time period according to Embodiment 3 of the disclosure.

In this embodiment, a PCRF entity receives a trigger or request message of provisioning PCC rules and QoS rules to a PCEF entity and a BBERF entity respectively during the modification process of the IP-CAN; the PCC rules and QoS rules comprise time indications of activation and/or deactivation of the rules. FIG. 4 shows a flowchart of a method for PCC based on a time period according to Embodiment 3 of the disclosure; as shown in FIG. 4, the method for PCC based on a time period comprises the following steps:

step S401: the PCRF entity receives a message for triggering policy modification, wherein the triggering might be from an AF entity, an SPR or the PCRF entity itself;

step S402: the PCRF entity makes a policy decision, making PCC rules and corresponding QoS rules, as well as time of activation and/or deactivation of the PCC rules and the QoS rules; this decision-making process comprises making new PCC rules and QoS rules as well as time of activation and/or deactivation of the new PCC rules and QoS rules, and updating provisioned PCC rules and QoS rules as well as time of activation and/or deactivation of theprovisioned PCC rules and QoS rules;

step S403: the PCRF entity sends the BBERF entity a gateway control and QoS rule providing message, in which the QoS rules newly made or updated by the PCRF entity policy decision and the time of activation and/or deactivation of the new QoS rules are included; if the time of activation and/or deactivation is updated, then the BBERF entity activates or deactivates the QoS rules according to the new time;

step S404: the BBERF entity returns an acknowledgement message to the PCRF entity;

step S405: the PCRF entity sends the PCEF entity a policy and charging rule is providing message, in which the PCC rules newly made or updated in step S402 and the time of activation and/or deactivation are included; the PCEF entity activates and or deactivates the PCC rules according to the time of activation and/or deactivation;

the time of activation and/or deactivation provided while the PCRF entity provides the QoS rules to the BBERF entity is the same as the time of activation and/or deactivation provided while the PCRF entity provides the PCC rules corresponding to the QoS rules to the PCEF entity; and step S406: the PCEF entity returns an acknowledgement message to the PCRF entity.

According to the flow above, the PCRF entity provisions new or updated PCC rules and QoS rules as well as time indications of activation and/or deactivation of the PCC rules and the QoS rules to the PCEF entity and the BBERF entity simultaneously according to a triggering message; therefore, the PCC rules or the QoS rules still can be simultaneously activated or simultaneously deactivated at a same time point.

Figure 5:
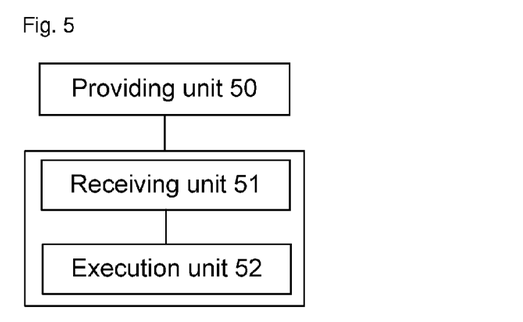
FIG. 5 shows a schematic diagram of a structure of a system for PCC based on a time period according to the disclosure.

FIG. 5 shows a schematic diagram of a structure of a system for PCC based on a time period according to the disclosure; as shown in FIG. 5, the system for PCC based on a time period comprises a providing unit 50 which is located in a PCRF entity and configured to provide QoS rules as well as a time indication of activation and/or deactivation of the QoS rules to a BBERF entity. The providing unit 50 further comprises a receiving sub-unit, a making and determining sub-unit and a providing sub-unit, wherein the receiving sub-unit is configured to receive an IP-CAN session establishment request message from the BBERF entity; the making and determining sub-unit is configured to, after the receiving sub-unit receives the IP-CAN session establishment request message, make PCC rules and QoS rules corresponding to the PCC rules and determine time of activation and/or deactivation of the PCC rules and the QoS rules; the providing sub-unit is configured to provide the QoS rules and the time of activation and/or deactivation of the QoS rules to the BBERF entity through a gateway control session establishment acknowledgement message.

Or, the providing unit 50 comprises a receiving sub-unit, a making and determining sub-unit and a providing sub-unit, wherein the receiving sub-unit is configured to receive a gateway control and QoS rule request message from the BBERF entity; the making and determining sub-unit is configured to, after the receiving sub-unit receives the gateway control and QoS rule request message, update and remake PCC rules and QoS rules corresponding to the PCC rules, and determine time of activation and/or deactivation of the updated or remade PCC rules and QoS rules; the providing sub-unit is configured to provide the updated or remade QoS rules and the time of activation and/or deactivation of the updated or remade QoS rules to the BBERF entity through a gateway control and QoS rule request acknowledgement message.

Or the providing unit 50 comprises a receiving sub-unit, a making and determining sub-unit and a providing sub-unit, wherein the receiving sub-unit is configured to receive a request of triggering PCC rule and QoS rule modification; the making and determining sub-unit is configured to, after the receiving sub-unit receives the gateway control and QoS rule request message, update and remake PCC rules and QoS rules corresponding to the PCC rules, and determine time of activation and/or deactivation of the updated or remade PCC rules and QoS rules; the providing sub-unit is configured to provide the updated and remade QoS rules as well as the time of activation and/or deactivation of the updated and remade QoS rules to the BBERF entity through a gateway control and QoS rule request acknowledgement message, wherein the request of modifying PCC rules and QoS rules is triggered by an AF entity, or an SPR and the PCRF entity.

In the disclosure, the providing unit 50 is further configured to provide PCC rules corresponding to the QoS rules and the time of activation and/or deactivation of the PCC rules to the PCEF entity, wherein the time of activation and/or deactivation of the QoS rules provided to the BBERF entity by the providing unit 50 is the same as the time of activation and/or deactivation of the PCC rules provided to the PCEF entity by the providing unit 50.

As shown in FIG. 5, the system for PCC based on a time period further comprises a receiving unit 51 and an execution unit 52, wherein the receiving unit 51 is located in the is BBERF entity and configured to receive the QoS rules and the time of activation and/or deactivation of the QoS rules provided by the providing unit; the execution unit 52 is located in the BBERF entity and configured to activate and or deactivate the QoS rules according to the time of activation and/or deactivation of the QoS rules.

Those skilled in the art should understand that the system for PCC based on a time period as shown in FIG. 5 is designed for implementing the method for PCC based on a time period mentioned above; the functions of each processing unit and each processing sub-unit in the device as shown in FIG. 5 can be understood by referring to the description in Embodiment 1 to Embodiment 3, the functions of each processing unit and each processing sub-unit can be realized by a program running on a processor or can be realized by a specific logical circuit.

The above are preferred embodiments only and not intended to limit the protection scope of the disclosure.

What is claimed is:

1. A method for Policy and Charging Control (PCC) based on a time period, comprising:

providing, by a Policy and Charging Rule Function (PCRF) entity, a time indication of activation and/or deactivation of Quality of Service (QoS) rules to a Bearer Binding and Event Reporting Function (BBERF) entity while providing the QoS rules by the PCRF entity to the BBERF entity;

wherein the step of providing the QoS rues by the PCRF entity to the BBERF entity comprises:

after the PCRF entity receives a gateway control session establishment request message from the BBERF entity, making PCC rules and QoS rules corresponding to the PCC rules by the PCRF entity, determining time of activation and/or deactivation of the PCC rules and the QoS rules by the PCRF entity, and providing the QoS rules and the time of activation and/or deactivation of the QoS rules by the PCRF entity to the BBERF entity through a gateway control session establishment acknowledgement message; or after the PCRF entity receives a gateway control and QoS rule request message from the BBERF entity, updating or remaking PCC rules and QoS rules corresponding to the PCC rules by the PCRF entity, determining time of activation and/or deactivation of the updated or remade PCC rules and QoS rules by the PCRF entity, and providing the QoS rules and the time of activation and/or deactivation of the QoS rules by the PCRF entity to the BBERF entity through a gateway control and QoS rule request acknowledgement message: or after the PCRF entity receives a request of triggering QoS rule modification, updating or remaking PCC rules and QoS rules corresponding to the PCC rules by the PCRF entity, determining time of activation and/or deactivation of the updated or remade PCC rules and QoS rules by the PCRF entity, and providing the QoS rules and the time of activation and/or deactivation of the QoS rules by the PCRF entity to the BBERF entity through a gateway control and QoS rule providing message.

2. The method according to claim 1, further comprising:

after the BBERF entity receives the QoS rules and the time indication of activation and/or deactivation of the QoS rules provided by the PCRF entity, activating and/or deactivating the QoS rules by the BBERF entity according to the time of activation and/or deactivation of the QoS rules.

3. The method according to claim 2, further comprising:
providing, by the PCRF entity, PCC rules corresponding to the QoS rules and time of activation and/or deactivation of the PCC rules to a Policy and Control Enforcement Function (PCEF) entity; wherein the time of activation and/or deactivation of the QoS rules provided to the BBERF entity is the same as the time of activation and/or deactivation of the PCC rules provided to the PCEF entity.

4. A system for Policy and Charging Control (PCC) based on a time period, comprising:
  a providing unit located in a Policy and Charging Rule Function (PCRF) entity and configured to provide QoS rules and a time indication of activation and/or deactivation of the QoS rules to a Bearer Binding and Event Reporting Function (BBERF) entity at the same time;
  wherein the providing unit further comprises:
  a receiving sub-unit configured to receive a control session establishment request message from the BBERF entity; or configured to receive a gateway control and QoS rule request message from the BBERF entity; or configured to receive a request of triggering PCC rule and QoS rule modification;
  a making and determining sub-unit configured to, after the receiving sub-unit receives the gateway control session establishment request message, make PCC rules and QoS rules corresponding to the PCC rules, and determining time of activation and/or deactivation of the PCC rules and the QoS rules; or configured to, after the receiving sub-unit receives the gateway control and QoS rule request message, update and remake PCC rules and QoS rules corresponding to the PCC rules, and determine time of activation and/or deactivation of the updated or remade PCC rules and QoS rules; and
  a providing sub-unit configured to provide the QoS rules and the time of activation and/or deactivation of the QoS rules o the BBERF entity through a gateway control session establishment acknowledgement message; or configured to provide the updated or remade QoS rules and the time of activation and/or deactivation of the updated or remade QoS rules to the BBERF entity through a gateway control and QoS rule request acknowledgement message.

5. The system according to claim 4, further comprising a receiving unit and an execution unit, wherein
  the receiving unit is located in the BBERF entity and configured to receive the QoS rules and the time of activation and/or deactivation of the QoS rules provided by the providing unit;
  the execution unit is located in the BBERF entity and configured to activate and/or deactivate the QoS rules according to the time of activation and/or deactivation of the QoS rules.

6. The system according to claim 5, wherein the providing unit is further configured to provide PCC rules corresponding to the QoS rules and time of activation and/or deactivation of the PCC rules to the PCEF entity, wherein the time of activation and/or deactivation of the QoS rules provided to the BBERF entity is the same as the time of activation and/or deactivation of the PCC rules provided to the PCEF entity.

* * * * *